(12) United States Patent
Graf et al.

(10) Patent No.: US 11,629,609 B2
(45) Date of Patent: Apr. 18, 2023

(54) SEALING ARRANGEMENTS IN GAS TURBINES

(71) Applicant: ANSALDO ENERGIA SWITZERLAND AG, Baden (CH)

(72) Inventors: Frank Graf, Nussbaumen (CH); Hans-Christian Mathews, Zürich (CH); Urs Benz, Gipf-Oberfrick (CH); Fabien Fleuriot, Rosenau (FR)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 1199 days.

(21) Appl. No.: 15/081,101

(22) Filed: Mar. 25, 2016

(65) Prior Publication Data

US 2016/0281522 A1    Sep. 29, 2016

(30) Foreign Application Priority Data

Mar. 27, 2015 (EP) ..................... 15161401

(51) Int. Cl.
*F01D 11/00* (2006.01)
*F01D 25/24* (2006.01)
(Continued)

(52) U.S. Cl.
CPC .............. *F01D 11/005* (2013.01); *F01D 9/00* (2013.01); *F01D 9/02* (2013.01); *F01D 9/042* (2013.01);
(Continued)

(58) Field of Classification Search
CPC ...... F01D 11/00; F01D 11/001; F01D 11/003; F01D 11/005; F01D 25/12; F01D 25/24;
(Continued)

(56) References Cited

U.S. PATENT DOCUMENTS 4,126,405 A * 11/1978 Bobo .................. F01D 9/042
                                                        415/115
4,300,868 A    11/1981 Wilkinson et al.
(Continued)

FOREIGN PATENT DOCUMENTS

CN    101737088 A    6/2010
CN    103206267 A    7/2013
(Continued)

OTHER PUBLICATIONS

Search Report dated Sep. 16, 2015, by the European Patent Office for Application No. 15161401.
(Continued)

*Primary Examiner* — Woody A Lee, Jr.
*Assistant Examiner* — Brian O Peters
(74) *Attorney, Agent, or Firm* — Buchanan Ingersoll & Rooney PC

(57) ABSTRACT

The invention concerns a gas turbine having a picture frame, a first vane, and a sealing arrangement to seal a gap between the picture frame and the first vane, the sealing arrangement including two seals arranged in series between the picture frame and the first vane. In exemplary embodiments, one of the seals is a honeycomb seal, a dogbone seal, a hula seal or a piston seal and the other seal is a honeycomb seal, a dogbone seal, a hula seal or a piston seal. A method of supplying cooling fluid to the gap between the picture frame and the first vane is also disclosed.

20 Claims, 7 Drawing Sheets

(51) Int. Cl.
  *F01D 9/04* (2006.01)
  *F01D 9/00* (2006.01)
  *F16J 15/00* (2006.01)
  *F02C 7/28* (2006.01)
  *F01D 9/02* (2006.01)
  *F01D 25/12* (2006.01)

(52) U.S. Cl.
  CPC .............. *F01D 11/00* (2013.01); *F01D 25/12* (2013.01); *F01D 25/24* (2013.01); *F01D 25/246* (2013.01); *F02C 7/28* (2013.01); *F16J 15/00* (2013.01); *F05D 2220/32* (2013.01); *F05D 2240/12* (2013.01); *F05D 2240/55* (2013.01); *F05D 2260/20* (2013.01)

(58) Field of Classification Search
  CPC . F01D 25/246; F01D 9/00; F01D 9/02; F01D 9/023; F01D 9/042; F02C 7/28; F16J 15/00
  See application file for complete search history.

(56) References Cited

U.S. PATENT DOCUMENTS

| | | | |
|---|---|---|---|
| 4,379,560 | A | 4/1983 | Bakken |
| 5,333,995 | A | 8/1994 | Jacobs et al. |
| 6,547,257 | B2* | 4/2003 | Cromer ................... F01D 9/023 277/355 |
| 7,178,340 | B2* | 2/2007 | Jorgensen ............... F01D 9/023 415/138 |
| 8,454,306 | B2 | 6/2013 | Mokulys et al. |
| 8,769,963 | B2* | 7/2014 | Ryan ....................... F01D 9/023 60/800 |
| 2004/0251639 | A1 | 12/2004 | Parker |
| 2010/0129207 | A1 | 3/2010 | Mokulys et al. |
| 2010/0300116 | A1 | 12/2010 | Kaleeswaran et al. |
| 2011/0120135 | A1 | 5/2011 | Johnson et al. |
| 2012/0304657 | A1 | 12/2012 | Melton et al. |
| 2012/0306166 | A1 | 12/2012 | Melton et al. |
| 2013/0084166 | A1 | 4/2013 | Klingels |
| 2013/0181408 | A1 | 7/2013 | Pakkala et al. |
| 2013/0256993 | A1 | 10/2013 | Burd et al. |
| 2013/0323045 | A1* | 12/2013 | Porter ................... F16J 15/0887 415/229 |
| 2016/0265377 | A1* | 9/2016 | Lutjen ................... F16J 15/104 |

FOREIGN PATENT DOCUMENTS

| | | |
|---|---|---|
| CN | 203559931 U | 4/2014 |
| EP | 2 532 837 A2 | 12/2012 |
| EP | 2 532 969 A2 | 12/2012 |
| EP | 2 574 731 A2 | 4/2013 |
| GB | 2 037 901 A | 7/1980 |

OTHER PUBLICATIONS

Search Report dated Sep. 29, 2015, by the European Patent Office for Application No. 15161400.
Office Action for Chinese Patent Application No. 201610370672.0 dated Mar. 7, 2019.
Office Action for Chinese Patent Application No. 201610370672.0 dated Mar. 7, 2019 (English Translation).
The Fourth Office Action issued by the National Intellectual Property Administration, P.R. China, in corresponding Chinese Patent Application No. 201610370672.0 dated Apr. 19, 2021 (18 pages including English translation).
First Office Action and Search Report dated Mar. 7, 2019, by the Chinese Patent Office in corresponding Chinese Patent Application No. 201610370672.0, and an English Translation of the Office Action (18 pages).

* cited by examiner

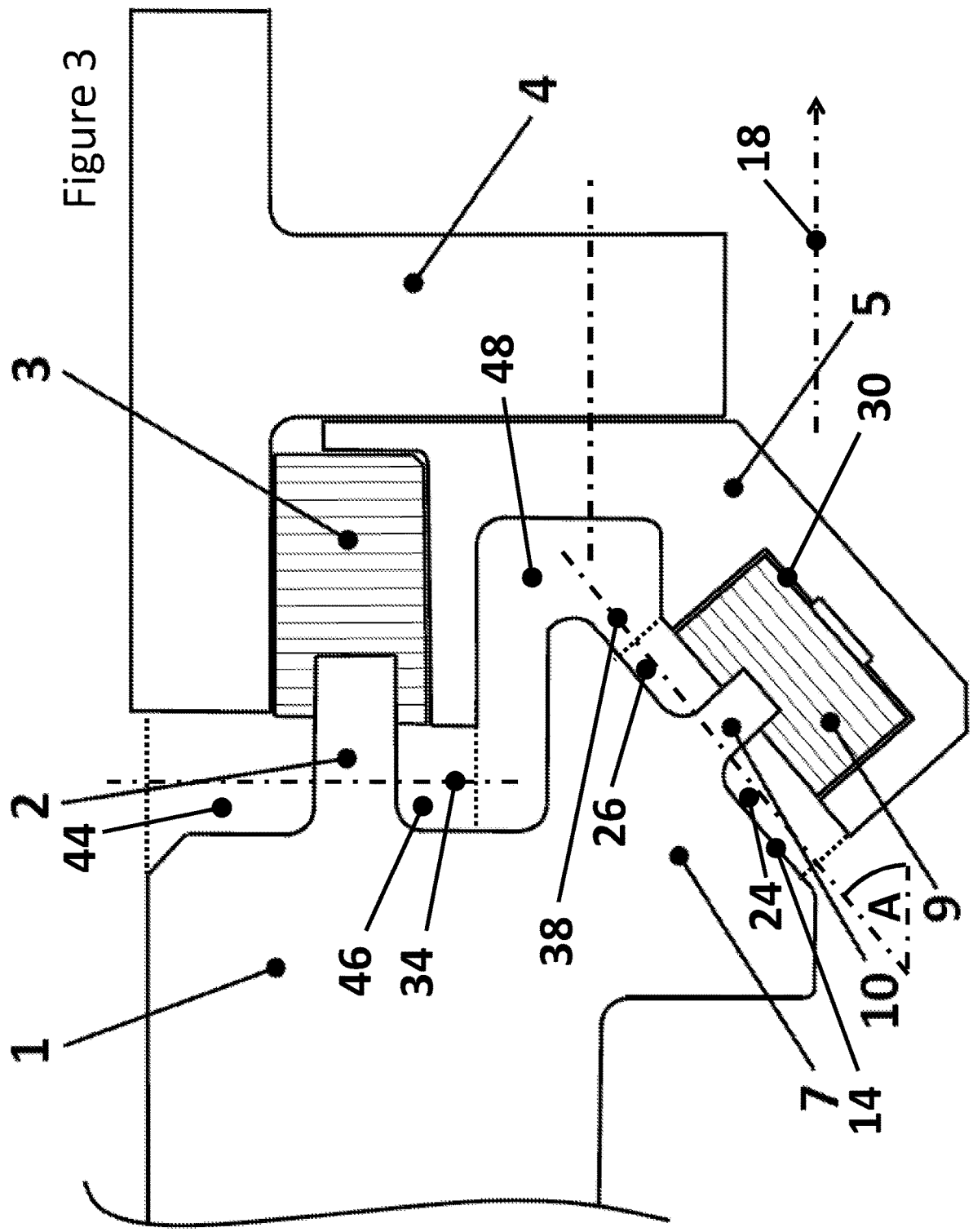

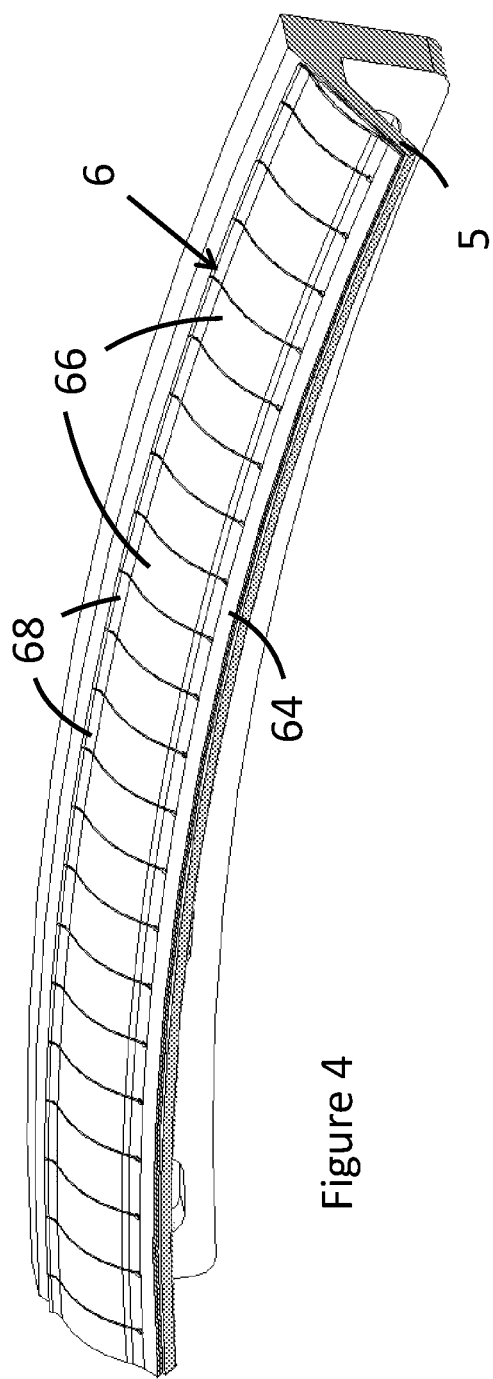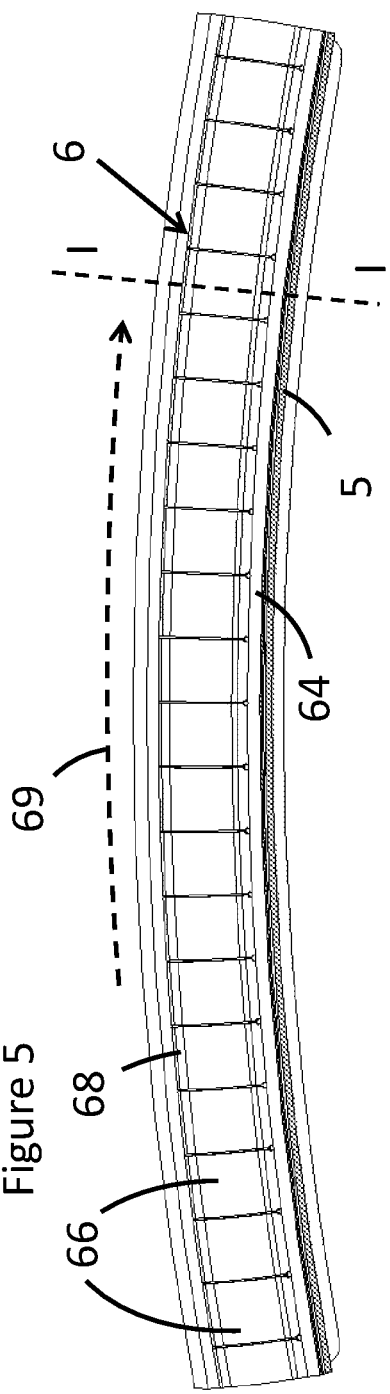

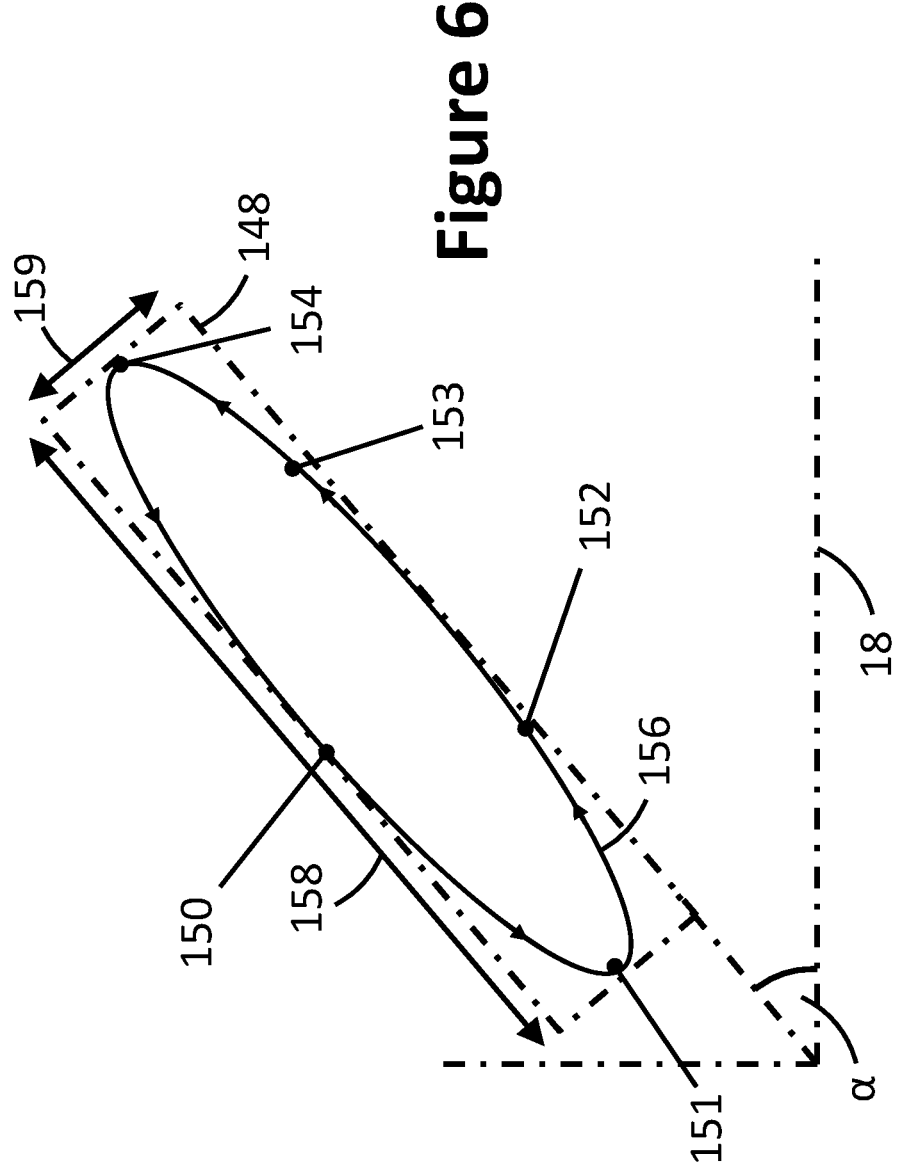

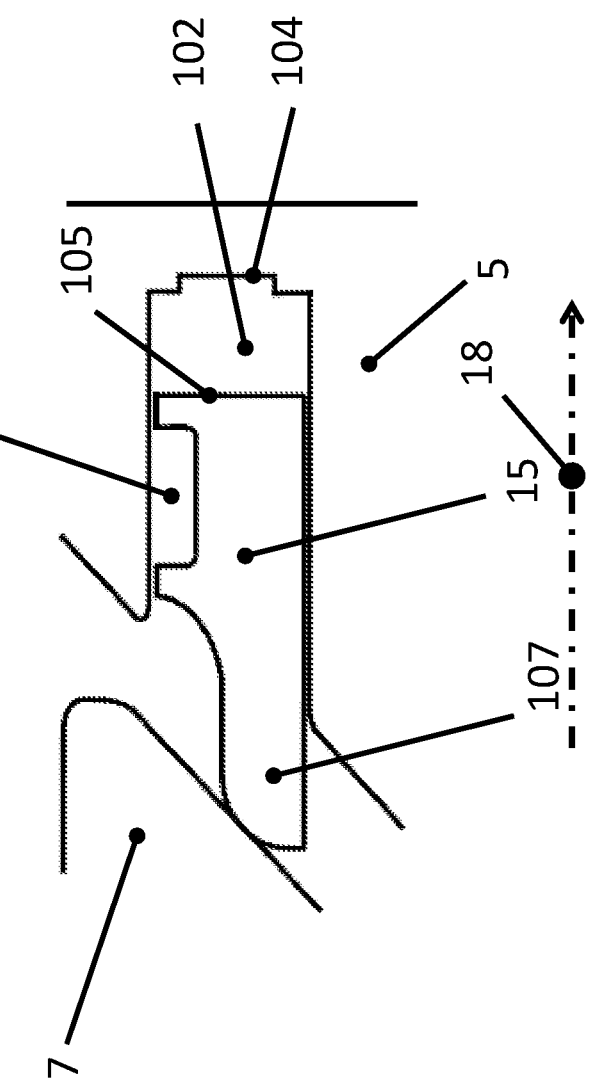

SEALING ARRANGEMENTS IN GAS TURBINES

TECHNICAL FIELD

The present disclosure relates to sealing arrangements in gas turbines, and particularly to sealing arrangements comprising two seals to seal the gap between the first vane and the picture frame.

BACKGROUND OF THE INVENTION

In a gas turbine, there is a gap between the picture frames in the combustor outlet and the first vane of the turbine. Movement of the two parts relative to one another can be considerable, and a gap must be left between the parts to avoid contact. The gap is generally purged with cooling air. It has been appreciated that it would be advantageous to improve the design around this gap to, for example, reduce the cooling air requirements.

SUMMARY OF THE INVENTION

The invention is defined in the appended independent claims to which reference should now be made. Advantageous features of the invention are set forth in the dependent claims.

According to a first aspect of the invention, there is provided a gas turbine comprising a picture frame, a first vane, and a sealing arrangement to seal a gap between the picture frame and the first vane, the sealing arrangement comprising two seals arranged in series between the picture frame and the first vane. This can help to reduce leakage and hot gas ingestion in the gap between the picture frame and the first vane, particularly on the inner platform (inner diameter) between each picture frame and the first vane (rocking vane). In particular, this can seal the gap during all operating conditions despite first vane movements in both the axial and radial directions (compared to the gas turbine longitudinal axis). The noble parts (first vane and picture frame) of the gas turbine are not affected, and the solution can be retrofitted to existing turbines. Use of two seals can also provide redundancy, so that the gap can still be sealed if one of the seals fails or the performance of one or both the seals deteriorates. The seal closest to the hot gas flow can reduce hot gas ingestion in particular, and the seal furthest from the hot gas flow can reduce and/or control the flow of cooling fluid in particular.

In one embodiment, one of the seals is a honeycomb seal, a dogbone seal, a hula seal or a piston seal and the other seal is a honeycomb seal, a dogbone seal, a hula seal or a piston seal. A piston seal can compensate for both axial and radial displacement, as the piston can be pushed up against the first vane by pressure behind the piston seal in the piston volume. In one embodiment, one of the seals is a honeycomb seal, the first vane comprises a sealing portion arranged to seal the gap in combination with the honeycomb seal.

In one embodiment, at least one of the seals is a hula seal, and at least one of the at least one hula seals is a conical hula seal. A conical hula seal can be particularly suited to cope with vane movements in both the axial and radial directions (compared to the gas turbine longitudinal axis).

In one embodiment, the conical hula seal comprises an inner part, a plurality of fingers and an outer part, wherein the inner part is attached to one end of each of the plurality of fingers and the outer part is attached to the other end of each of the plurality of fingers.

In one embodiment, at least one of the seals is a dogbone seal, and the picture frame comprises a socket for holding the dogbone seal. In one embodiment, at least one of the seals is a piston seal, the piston seal comprises a piston seal front end for contacting a first vane, the majority of the piston seal front end is at least half the width of the widest part of the piston seal in a radial direction relative to a gas turbine longitudinal axis, and the piston seal front end has a tapered portion for contacting the first vane.

In one embodiment, the first vane comprises a first vane contact surface to contact at least one of the seals. In one embodiment, the first vane contact surface is parallel or substantially parallel to a surface of the picture frame on the opposite side of the gap.

In one embodiment, the first vane contact surface is conical or spherical. This can help better seal the gap. In one embodiment, the first vane contact surface is angled such that an elastic range of movement of the first vane relative to the picture frame is minimised. This can minimise the gap width and make sealing the gap easier.

According to a second aspect of the invention, there is provided a method of cooling a gas turbine comprising a picture frame, a first vane, and a sealing arrangement to seal the gap between the picture frame and the first vane, the sealing arrangement comprising two seals arranged in series between the picture frame and the first vane, comprising the step of supplying cooling fluid to the gap between the picture frame and the first vane. This can purge the gap to reduce hot gas ingestion.

In one embodiment, the method comprises the step of maintaining a higher pressure at the end of the gap furthest from a hot gas flow than the pressure at a hot gas flow end of the gap.

In one embodiment, at least one of the seals is a piston seal and the method comprises the step of supplying cooling fluid to a volume between the piston seal and the picture frame such that the piston seal remains in contact with the first vane.

BRIEF DESCRIPTION OF THE DRAWINGS

An embodiment of the invention will now be described by way of example only and with reference to the accompanying drawings in which:

FIG. 3 shows a cross-section of an embodiment of the invention comprising two honeycomb seals;

FIG. 4 shows a perspective view of a conical hula seal on a bulkhead;

FIG. 5 shows a top view of the conical hula seal of FIG. 4;

FIG. 6 shows graphically the movement of a point on the first vane surface during gas turbine operation;

FIG. 8 shows a cross-section view of an alternative piston seal.

DETAILED DESCRIPTION OF THE PREFERRED EMBODIMENTS

Figure 1:
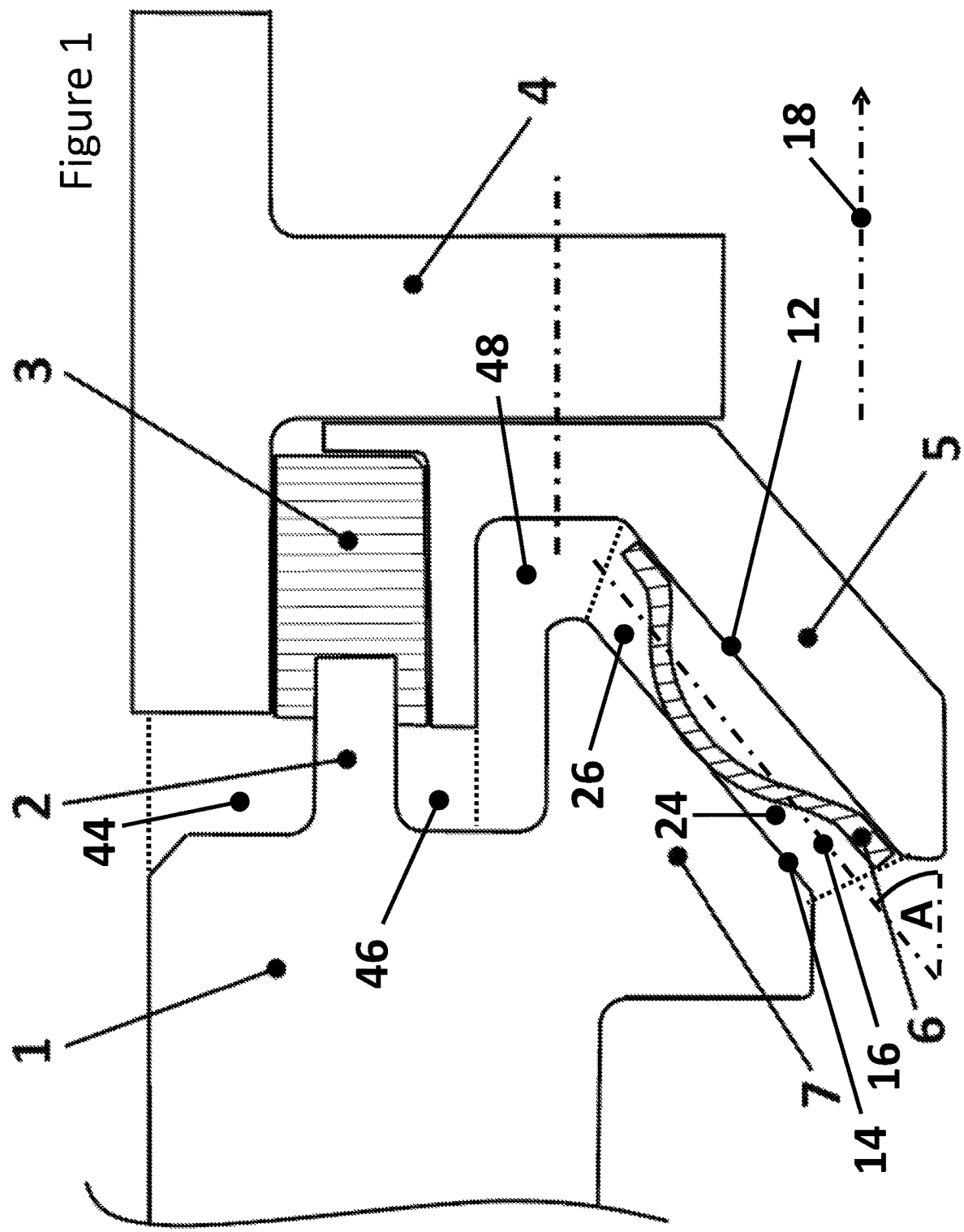
FIG. 1 shows a cross-section of an embodiment of the invention comprising a honeycomb seal and a conical hula seal.

FIG. 1 shows a first vane 1 (rocking vane) on one side of a gap 24, 26, 44, 46, to be sealed, with a first sealing portion 2 and a second sealing portion 7 (vane tooth). On the other side of the gap 24, 26, 44, 46 to be sealed is a picture frame 4 and a bulkhead 5 attached to the picture frame 4. The bulkhead 5 is shown as a separate component to the picture frame 4 in the embodiments in this application, but the bulkhead 5 may also be an integral part of the picture frame 4. In the gap 24, 26, 44, 46 between the first vane 1 and the picture frame 4 and bulkhead 5, a first seal (honeycomb seal 3) and a second seal (conical hula seal 6) are arranged.

The honeycomb seal 3 is arranged between the picture frame 4 and the bulkhead 5 on one side of the gap 44, 46. The first sealing portion 2, which is a protrusion extending from the first vane 1, extends across the gap 44, 46 to interact with the honeycomb seal 3 and seal the gap 44, 46.

The conical hula seal 6 extends between the second sealing portion 7 and the bulkhead 5. Preferably, the surface 12 of the bulkhead adjacent to the conical hula seal 6 and the surface 14 of the second sealing portion 7 adjacent to the conical hula seal 6 are parallel or substantially parallel (in use they will not always be parallel), both extending in a hula seal direction 16, the hula seal direction 16 being at an angle from the longitudinal axis direction 18. The longitudinal axis direction 18 is the direction of the longitudinal axis of the gas turbine (not shown), which is generally also parallel to the axis of the first vane 1 and the picture frame 4.

Figure 2:
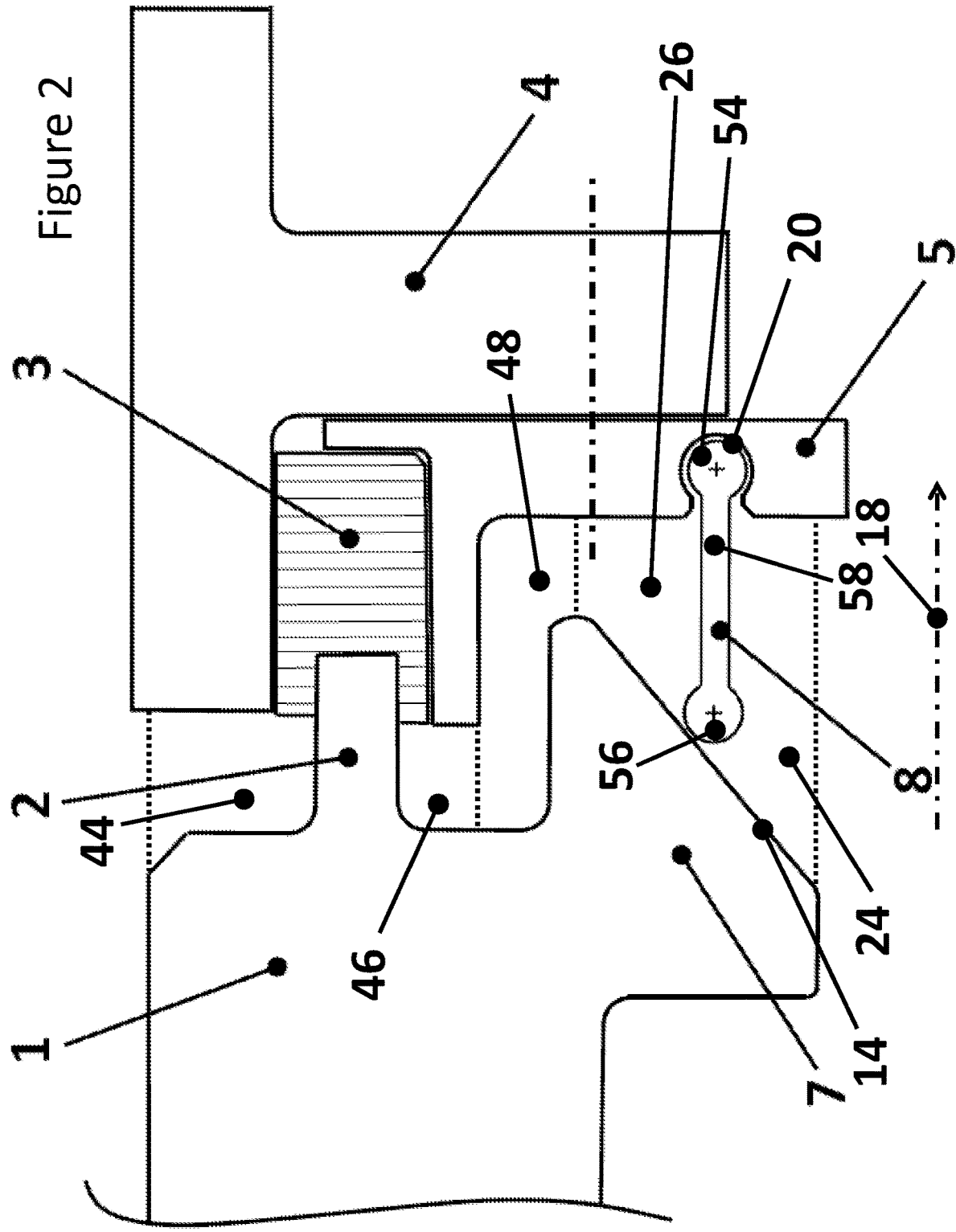
FIG. 2 shows a cross-section of an embodiment of the invention comprising a honeycomb seal and a dogbone seal.

In FIG. 2, an alternative embodiment is shown in which a dogbone seal 8 is provided as the second seal rather than a conical hula seal. The dogbone seal 8 comprises a bulkhead portion 54 adjacent to the bulkhead, a first vane portion 56 adjacent to the second sealing portion 7, and a central portion 58 joining the bulkhead portion and the first vane portion. The bulkhead portion 54 and the first vane portion 56 are typically cylindrical. The bulkhead 5 also differs from the bulkhead in FIG. 1 in that a socket 20 is provided to hold the dogbone seal 8. In FIG. 2, the last part of the gap 24 is effectively part of the compressor plenum.

In FIG. 3, an alternative embodiment is shown in which a second honeycomb seal 9 is provided as the second seal. The bulkhead 5 comprises a recess 30 in which the second honeycomb seal 9 is placed. In addition, the second sealing portion 7 comprises a second sealing portion nose 10. This second sealing portion nose 10 has the same function as first sealing portion 2. The first seal (honeycomb seal 3), as in the embodiments in FIGS. 1 and 2, is provided to seal a first gap 44, 46 which extends in a direction 34 perpendicular to the longitudinal axis direction 18. The second seal (second honeycomb seal 9) is provided to seal a second gap 24, 26 which extends in a direction 38, the direction 38 being at an angle A from the longitudinal direction 18.

Hula seals such as that shown in FIG. 1 will now be described in more detail. In annular hula seals, the hula seal describes a ring in which the inner part and the outer part are at the same distance from the central axis of the hula seal (i.e. the axis through the centre of the hula seal, which is the hula seal longitudinal axis in the longitudinal axis direction 18). In contrast, a conical hula seal has an inner part that is closer to the central axis of the hula seal than the outer part. In other words, the hula seal direction in an annular hula seal is parallel to the longitudinal axis direction 18 (hula seal longitudinal axis), whereas the hula seal direction in a conical hula seal is at an angle from the longitudinal axis direction 18.

A cone is a three-dimensional geometric shape that tapers smoothly from a flat base; the base may be circular or may be another shape. Mathematically, a conical hula seal is conical frustum, being in the shape of the surface of the frustum of a cone (i.e. a section of the cone not including the apex, also known as a truncated cone), in contrast to an annular hula seal in which the hula seal follows the shape of the surface of a cylinder. It should be noted for completeness that hula seals do not strictly describe a precisely annular or conical shape, as can be seen in FIG. 3 for example, where a conical hula seal 6 follows a hula seal direction 16 but the curvature of the fingers deviates slightly from a perfect cone.

FIGS. 4 and 5 show a conical hula seal 6 attached to a bulkhead 5, which is in turn attached to or part of a picture frame 4 (see FIG. 1). The conical hula seal 6 comprises an inner part 64 extending in a circumferential direction 69 relative to a longitudinal axis direction 18 (hula seal axis direction, see FIG. 1). The inner part 64 is configured to be attached to the surface 12 (see FIG. 1) of the bulkhead 5. A plurality of fingers 66, each attached to the inner part 64, extend away from the inner part 64 in a hula seal direction 16 (see FIG. 1). An outer part 68 is provided at the distal end of the fingers 66 from the inner part 64. The conical hula seal extends in a hula seal direction 16 (see FIG. 1) at an angle A from the longitudinal axis direction 18. A cross section of the conical hula seal 5 along the line I-I in FIG. 5 would correspond to the view of the conical hula seal 5 in FIG. 1. It is noted that the bulkhead of FIG. 4 is a different design to the bulkhead of FIG. 1.

The fingers 66 do not extend in a straight line, but curve such that the direction of each finger describes an angle greater than angle A (see FIG. 1) nearer the inner part 64 and an angle smaller than angle A near the outer part 68. The outer part 68 is arranged to slidably contact the surface 12 (see FIG. 1) of the bulkhead 56.

The hula seal may be an entire ring or may be made up of multiple individual hula seals (hula seal segments). The hula seal of FIG. 5 is a hula seal segment. In one example, 20 hula seals are placed around the 360° annular joint, each extending 15° around the circumference in the circumferential direction 40. The other types of seals described herein may also be segmented in this way.

In a gas turbine, a plurality of picture frames (sequential liner outlets) are arranged around the longitudinal axis of the gas turbine in a ring, with the picture frames typically being attached to sequential liners and with the sequential liners surrounding can combustors. In other words, the picture frames all intersect a plane perpendicular to the longitudinal axis. The sealing solution discussed in this application can be applied on the inner diameter of the picture frames (the edge of the picture frames closest to the longitudinal axis). Preferably, each picture frame has a separate seal segment or segments; that is, seal segments do not extend across multiple picture frames in the circumferential direction relative to the longitudinal axis. This can allow for single vane/blade assembly and/or disassembly during manufacture, maintenance and repair.

The sealing solution discussed in this application is preferably for sealing a gap between two static parts such as the gap between the picture frame and the first vane.

When in use, the second sealing portion surface 14 (more specifically, a particular spot on the second sealing portion surface 14) will move along a path similar to that shown in FIG. 6 during its operation cycle. The range of movement fits within an angled rectangular box 148, angled at an angle α from the longitudinal axis direction 18. Preferably, angle A (see FIGS. 1 and 3) is the same or substantially the same as angle α. There are two directions of movement, the sliding range 158 and the elastic range 159. Movement in the direction of the sliding range 158 can be due to rocking (rotation) of the first vane, for example, and movement in the direction of the elastic range 159 can be due to thermal expansion/contraction of components, for example.

Initially, at the assembly or cold position 150 in FIG. 6, the first vane 1 is in a certain position. During startup, the first vane starts moving in a direction as shown by movement line 156, passing through point 151 which may be a first maximum extent in the sliding range. At full load, the first vane position may be at point 152, and during steady state operation the first vane position may be at point 153. During operation, the loading may vary, and the first vane position may vary accordingly, moving on or near the movement line 156 in the area between and around points 152 and 153. On shut down, the first vane then cools and continues further around the movement line 156. During shut down, the first vane reaches a second maximum extent on the sliding range at point 154. Once fully cooled, the first vane will have completed a full circle of movement line 156, arriving back at its cold position at point 150. The movement line 156 of FIG. 6 and the description of the points on the curve are an approximation, and deviations may occur from this approximation.

During assembly of the gas turbine, the sealing portion 2 is crushed into the honeycomb seal 3 and generally stays in contact during operation. Similarly, the second sealing portion nose 10 would be crushed into the honeycomb seal 9.

In use, cooling fluid may be supplied to the gap between the picture frame and the first vane. This can help reduce hot gas ingestion and can purge the gap.

Figure 7:
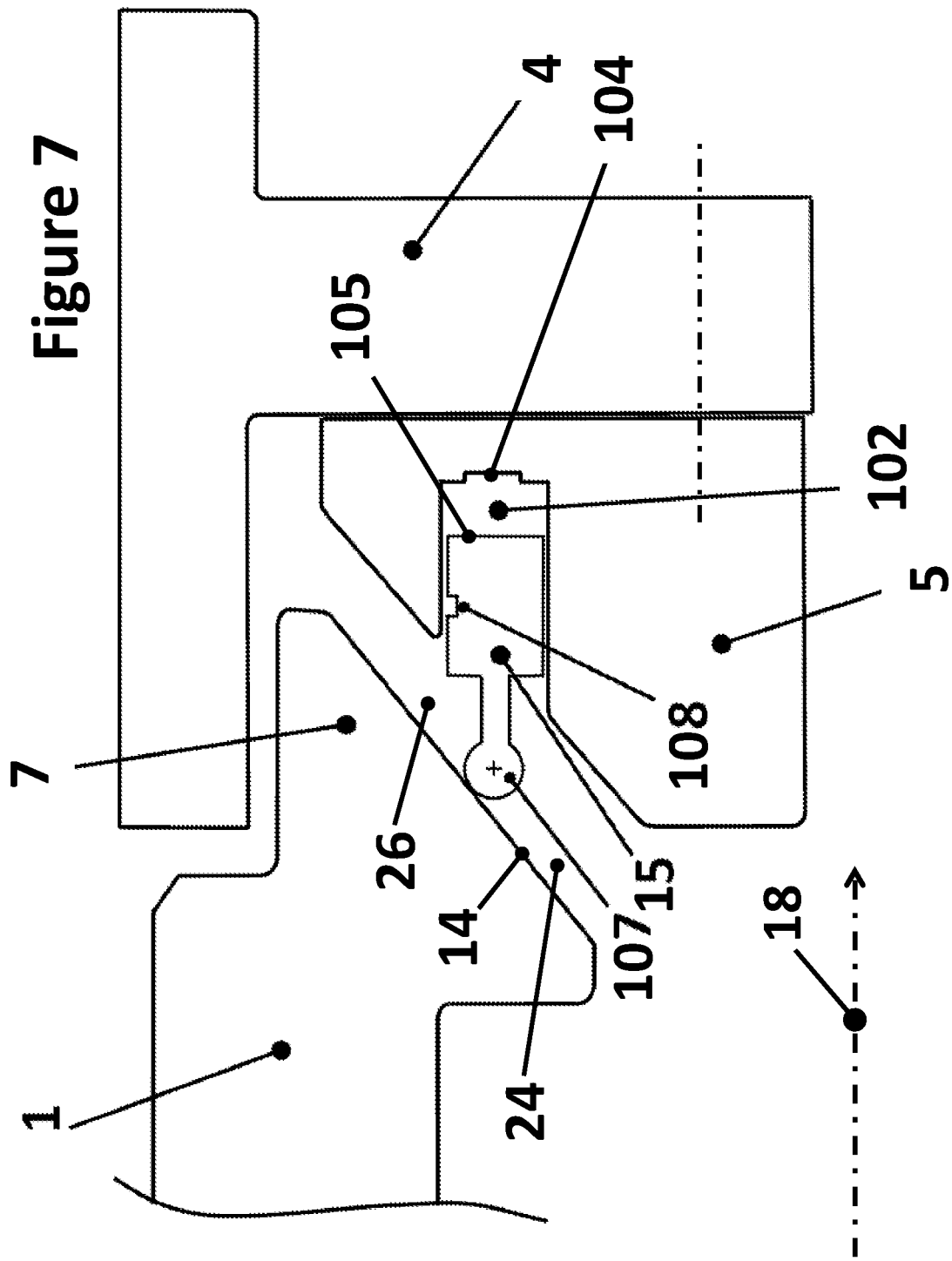
FIG. 7 shows a cross-section view of a piston seal.

A further alternative seal is shown in FIG. 7, namely a piston seal 15. As with the other seals described herein, the piston seal 15 is designed to seal the gap 24, 26 between the second sealing portion 7 of the first vane 1 and the bulkhead 5, which is attached to the picture frame 4. At a front end of the piston seal, a piston seal front end 107 is arranged to contact the second sealing portion surface 14; the front end of the piston seal is shaped like one half of a dogbone seal. A back end 105 of the piston seal 15 is arranged in a piston volume 102 of the bulkhead 5. The piston seal 15 can move relative to the bulkhead 5. At a back end 104 of the piston volume 102, a source of pressure (not shown) such as a source of cooling fluid is provided. Optionally, a notch 108 for an additional seal (not shown; for example a rope seal) is provided in one or both of the side walls of the piston. This notch could alternatively be in one of both of the side walls of the piston volume. This additional seal can help reduce leakage past the back end 105 of the piston seal 15.

FIG. 8 shows an alternative embodiment of the piston seal of FIG. 7, with an alternative shape of piston seal front end 107. In this design, a majority of the extent (preferably at least 75%) of the piston seal front end (i.e. the part of the piston seal extending across the gap to contact the first vane) is more than half the width of the piston volume (the width of the piston volume in the direction perpendicular to the longitudinal axis direction 18; this is normally the same or very similar to the width of the main part of the piston seal). This design may be more rigid than the embodiment in FIG. 7. The part of the front end 107 adjacent to the first vane is preferably tapered. The taper is preferably a convex shape; this can allow better contact with the first vane over a range of operating conditions.

The piston seal 15 may be various shapes besides the examples in FIGS. 7 and 8.

As with many of the other embodiments described herein, the second sealing portion surface 14 in FIG. 6 is preferably substantially parallel to the bulkhead surface, on the opposite side of the gap.

The piston seal embodiment in FIGS. 7 and 8 is shown with a piston volume 102 in the bulkhead 5 parallel to longitudinal axis direction 18, but the piston volume 102 may be angled in other directions, for example perpendicular to the second sealing portion surface 14. The piston seal would also be re-orientated accordingly in line with the piston volume.

The depth of the piston volume 102 from the bulkhead surface 12 to the back end 104 of the piston volume 102 may be determined during a design phase based on the length of the piston seal 15 and the expected size of the gap between the bulkhead surface 12 and the second sealing portion surface 14.

When in use, the pressure in the cavity in between the back end 104 of the cavity 102 and the back end 105 of the piston seal 15 is preferably higher than the pressure in the gap 24, 26 on either side of the piston seal 15. At a minimum, the pressure at the back end 105 should be high enough to keep the piston seal front end 107 adjacent to the second sealing portion surface 14. The honeycomb seal 3 and/or the second honeycomb seal 9 may also have a similar pressure profile, with a source of pressure such as a source of cooling air provided to push the honeycomb seal 3/second honeycomb seal 9 against the first sealing portion and second sealing portion nose respectively.

A limited number of specific embodiments are described above. More generally, various sealing solutions can be used to seal the gap between the picture frame 4 and the first vane 1. For the first seal, a honeycomb seal is shown in FIGS. 1 to 3, but any of the other seals described in this application could also be used as the first seal. Similarly, any of the seals in this application could be used as the second seal. Any combination of seals is also possible. For example, both the first and second seals could be conical hula seals, with the picture frame and first vane designed so that the picture frame and first vane have the structure shown surrounding the conical hula seal in FIG. 3 for both the first seal and the second seal. Three or more seals in series could also be provided.

The first and second seals would be in series; that is, the second seal would be in a different part of the gap to the first seal in the axial direction perpendicular to the longitudinal axis direction 30. In other words, any escaping hot gas from the hot gas flow would have to pass through both the conical hula seal and the second seal.

The seals described herein may be an entire ring or may be made up of multiple individual seals (seal segments). For example, the conical hula seal 6 of FIG. 4 is a hula seal segment. In one example, 20 seals are placed around the 360° annular joint, each extending 15° around the circumference in the circumferential direction 69.

Each seal can describe a partial or full ring as described above. The longitudinal axis direction 18 will typically be perpendicular to the plane of this partial or full ring. For seal segments, the longitudinal axis of each seal segment is the longitudinal axis of a full ring of seal segments. The seal longitudinal axis will generally also be the longitudinal axis of the picture frame at the end of the sequential liner (the combustor outlet) and/or the gas turbine longitudinal axis.

The first sealing portion 2 and the additional seal portion 10 may be various shapes; these parts are required to extend across the gap from the first vane to interact with a honeycomb seal. Similarly, the socket 20 could vary in shape depending on the shape of the dogbone seal and the recess 30 could vary depending on the shape of the second honeycomb seal and the bulkhead.

The bulkhead 5 is shown varying in shape in the different embodiments shown in the Figures to accommodate the different types of seal. These bulkhead shapes are examples, and other bulkhead shapes are also possible. For example, a bulkhead of the shape shown in FIG. 1 could be amended by the addition of a socket 20 for the dogbone seal but otherwise retain its shape. The bulkhead surface, second sealing portion surface and first vane shape can also vary depending on the seals used.

The vane tooth 7 is a part of the first vane 1 in the embodiments above, but may also be a separate component attached to the first vane. The first sealing portion 2 and the additional seal portion 10 may also each be either an integral part of the first vane 1 or separate components attached to the first vane.

The honeycomb seal 3 as a first seal is shown between the picture frame and the bulkhead in the embodiments described above. Alternatively, the honeycomb seal 3 could be attached only adjacent to the picture frame or only adjacent to the bulkhead.

In FIG. 3, the honeycomb seal 9 as a second seal is angled at an angle A from the longitudinal axis direction 18. Alternatively, a second honeycomb seal at a different angle could be used, for example a honeycomb seal similar to the honeycomb seal as a first seal in FIGS. 1 to 3 or a honeycomb seal at an angle parallel to the longitudinal axis direction. The design of the bulkhead 5 and the second sealing portion 7 would need adjusting accordingly. Similarly, the honeycomb seal 3 as a first seal of any of the embodiments could be angled in a different direction to that shown in FIGS. 1 to 3.

The honeycomb is generally orientated so that it can elastically deform under the pressure of the first sealing portion 2 or the second sealing portion surface 14. The lines shown in the honeycomb seal 3 and second honeycomb seal 9 show the walls of the honeycomb; that is, the hexagonal nature of the honeycomb structure would be seen if the seal was viewed in the direction of the lines shown in the honeycomb. The honeycomb seal 3 shown in the Figures is aligned such that the hexagonal honeycomb structure extends in a circumferential direction relative to the gas turbine longitudinal axis. The second honeycomb seal 9 shown in FIG. 9 has the hexagonal honeycomb structure at a different angle, extending perpendicular to the second sealing portion surface 14.

Although only a conical hula seal is shown in the Figures, an annular hula seal may also be used. A radial hula seal could also be used, which is the extreme case where the hula seal direction is perpendicular to the longitudinal axis direction 18. In the case of a conical hula seal, the hula seal direction 16 can be at an angle A other than that shown in the examples, and is preferably set such that angle A is within 15° of angle $\alpha$, more preferably within 5°, and most preferably at an angle A=$\alpha$. This is the angle that minimises the relative movement of the first vane and the picture frame/bulkhead during gas turbine operation. This minimises the elastic range 159 and thus enables the gap between the first vane and the picture frame/bulkhead, specifically between the second sealing portion surface 14 and the bulkhead surface 12, to be minimised. This minimises the required range of movement of the conical hula seal. Similarly, the bulkhead surface 12 associated with the conical hula seal is preferably at an angle within 15° of angle $\alpha$, more preferably within 5°, and most preferably at an angle A=$\alpha$, and the second sealing portion surface is preferably within 15° of angle $\alpha$, more preferably within 5°, and most preferably at an angle A=$\alpha$.

The dogbone seal 8 is shown as extending parallel to the longitudinal axis direction 18 in FIG. 2, but may also extend at an angle to the longitudinal axis direction 18. Other shapes of dogbone seal could be used besides the example described above; the same is true for the hula seals, dogbone seals, piston seals and honeycomb seals described herein.

In the embodiment of FIG. 2, a further socket (not shown) may be provided in the second sealing portion 7 to hold the dogbone seal 8 in place. When the dogbone seal is held at both ends in this way, it will generally need to be made of an extendable material, as the distance between the two sockets will vary when in use. When the dogbone seal is held at only one end, it is generally necessary for the gap to be narrower on the side of the dogbone seal that is at a lower pressure. The further socket (not shown) is optional because the pressure difference can hold the seal in place—the volume 24 (of the gap between the picture frame 4/bulkhead 5 and the first vane 1) that is closer to the longitudinal axis than the dogbone seal 8 is at a higher pressure than the volume 26 (of the gap between the picture frame 4/bulkhead 5 and the first vane 1) further from the longitudinal axis than the dogbone seal 8. The pressure difference, along with the shape of the gap, which is narrower on the side of the dogbone seal that is at a lower pressure, keeps the dogbone seal in a position that seals the gap. As a result, it is not essential to provide support on the second sealing portion 7. Alternatively, a socket could be provided in only the first vane 1 (for example in the vane tooth 7) and not in the bulkhead 5.

Considerable variation is possible in the shape, direction, width and length of the gap between the picture frame and the first vane. The first gap 44, 46 largely extends in a direction perpendicular to the longitudinal direction 18, with the first sealing portion 2 extending into the gap to help seal the gap along with honeycomb seal 3. As implied above when discussing the angles of the various seals, this gap may extend in a different direction in alternative embodiments. Similarly, second gap 24, 26 may extend in a direction other than that shown in FIGS. 1 to 3. The shape of the various parts of the first vane (first sealing portion, second sealing portion, second sealing portion nose, second sealing portion surface) may also vary accordingly.

As with the gap sealed by a dogbone seal 8 in the embodiment in FIG. 2, the gaps may also vary in width along their extent.

For ease of reference, different parts of the gap between the first vane and the picture frame/bulkhead have been denoted with reference numerals. The gap comprises three parts, a first gap 44, 46, an intermediate region 48 and a second gap 24, 26. Dotted lines are shown to delineate where these three regions of the gap could start and finish.

The first gap 44, 46 between the first vane and the picture frame/bulkhead corresponds to the part of the gap with the first seal, and is divided into a volume 44 adjacent to the hot gas flow (not shown) and a volume 46 on the other side of the first sealing portion 2 to the hot gas flow.

The pressure is typically higher in the volume 46 on the other side of the first sealing portion 2 to the hot gas flow than in the volume 44 adjacent to the hot gas flow; this can allow for a purging flow to leak through the seal, avoiding hot gas ingestion past the first sealing portion and the first seal.

There is then an intermediate region 48 of the gap between the first gap 44, 46 and the second gap 24, 26, although this intermediate region 48 is optional and the first gap 44, 46 and second gap 24, 26 may lead directly to one another.

The second gap 24, 26 has a similar structure to the first gap 44, 46, with a volume 24 in the gap on the far side of the second sealing portion nose 10 relative to the hot gas flow and a volume 26 in the gap on the near side of the second sealing portion nose 10 relative to the hot gas flow (adjacent to the intermediate region 48 or the first gap 44, 46).

In the case of a piston, dogbone or hula seal, the seal itself would split the first or second gap region rather than the first sealing portion or the second sealing portion nose as shown in the honeycomb seals embodiment of FIG. 3. In the case of a hula seal, an additional portion of the volume of the gap is between the hula seal itself and the bulkhead.

Various modifications to the embodiments described are possible and will occur to those skilled in the art without departing from the invention which is defined by the following claims.

| REFERENCE SIGNS | |
|---|---|
| 1 | first vane |
| 2 | first sealing portion |
| 3 | honeycomb seal |
| 4 | picture frame |
| 5 | bulkhead |
| 6 | conical hula seal |
| 7 | second sealing portion |
| 8 | dogbone seal |
| 9 | second honeycomb seal |
| 10 | second sealing portion nose |
| 12 | bulkhead surface |
| 14 | second sealing portion surface (first vane contact surface) |
| 15 | piston seal |
| 16 | hula seal direction |
| 18 | longitudinal axis direction |
| 20 | socket |
| 24 | (partial) volume of the second gap (end of the gap furthest from the hot gas flow) |
| 26 | (partial) volume of the second gap |
| 30 | recess |
| 34 | first gap direction |
| 38 | second gap direction |
| 44 | (partial) volume of the first gap (hot gas flow end of the gap) |
| 46 | (partial) volume of the first gap |
| 48 | intermediate region of the gap |
| 54 | dogbone seal bulkhead portion |
| 56 | dogbone seal first vane portion |
| 58 | dogbone seal central portion |
| 64 | inner part |
| 66 | finger |
| 68 | outer part |
| 69 | circumferential direction |
| 102 | piston volume |
| 104 | back end of the piston volume |
| 105 | back end of the piston seal |
| 107 | piston seal front end |
| 108 | notch |
| 148 | angled rectangular box |
| 150 | assembly/cold position |
| 151 | startup |
| 152 | full load |
| 153 | steady state operation |
| 154 | extreme point in shut down |
| 156 | movement line |
| 158 | sliding range |
| 159 | elastic range |
| A | angle |
| α | angle |

The invention claimed is:

1. A gas turbine comprising:
a longitudinal axis;
a picture frame having a flange extending radially inward, the picture frame being a member of an annular arrangement of a plurality of picture frames arranged around the longitudinal axis of the gas turbine in an annular shape;
a first vane, the first vane having a first sealing portion and a second sealing portion, the second sealing portion being configured so that a spot on the second sealing portion surface will move during an operation cycle with a range of movement fitting within an angled rectangular box, angled at a first angle from the longitudinal axis;
a bulkhead arranged between the picture frame and the first vane;
a gap between the picture frame and the first vane, and the first vane and the bulkhead, the gap including a first gap portion, an intermediate portion and a second gap portion consecutively arranged and delimited by the first vane on one side and by one of the picture frame and the bulkhead on an other side, the first gap portion extending in a direction perpendicular to the longitudinal axis adjacent to a hot gas flow, the second gap portion extending in a direction at a second angle from the longitudinal axis and angled from the direction perpendicular to the longitudinal axis, the second angle being the same as the first angle, the intermediate gap portion including a section parallel to the longitudinal axis;
a sealing arrangement to seal the gap, the sealing arrangement having two seals arranged in series, a first one of the two seals being arranged to seal the first gap portion between the picture frame and the first sealing portion of the first vane and between the bulkhead and the first sealing portion of the first vane, the first one of the two seals dividing the first gap portion into a first volume adjacent to a hot gas flow and a second volume on an opposite side of the first one of the two seals to the hot gas flow;
a second one of the two seals being arranged to seal the second gap portion between the bulkhead and the second sealing portion of the first vane;
the first one of the two seals configured to seal against a surface of the picture frame, a first surface of the bulkhead, and the first sealing portion of the first vane, and wherein the first sealing portion of the first vane is crushed into the first one of the two seals; and
the second one of the two seals configured to seal against a surface of the second sealing portion of the first vane and a second surface of the bulkhead, the surface of the second sealing portion of the first vane and the second surface of the bulkhead being parallel and at the second angle.

2. The gas turbine of claim 1, wherein the first one of the two seals is a honeycomb seal, a dogbone seal, a hula seal or a piston seal and the second one of the two seals is a honeycomb seal, a dogbone seal, a hula seal or a piston seal.

3. The gas turbine of claim 2, wherein at least one of the two seals is a hula seal, and at least one of the at least one of the two seals that is the hula seal is a conical hula seal.

4. The gas turbine of claim 3, wherein the conical hula seal comprises:
an inner part, a plurality of fingers and an outer part, wherein the inner part is attached to one end of each of the plurality of fingers and the outer part is attached to an other end of each of the plurality of fingers.

5. The gas turbine of claim 2, wherein the first vane comprises:
a first vane contact surface to contact at least one of the two seals.

6. The gas turbine of claim 5, wherein the first vane contact surface is parallel to a second surface of the bulkhead on a side of the gap opposite the first vane contact surface.

7. The gas turbine of claim 5, wherein the first vane contact surface is conical.

8. The gas turbine of claim 5, wherein the first vane contact surface is an angled first vane contact surface such that movement of the first vane relative to the bulkhead is minimized.

9. The gas turbine of claim 1, wherein the first one of the two seals is a honeycomb seal, and wherein the first sealing portion of the first vane comprises:
a sealing portion arranged to seal the gap in combination with the honeycomb seal.

10. The gas turbine of claim 1, wherein at least one of the two seals is a dogbone seal, and the picture frame comprises:
a socket for holding the dogbone seal.

11. The gas turbine of claim 1, wherein
at least one of the two seals is a piston seal,
the piston seal includes a piston seal front end for contacting a first vane,
the majority of the piston seal front end is at least half the width of the widest part of the piston seal in a radial direction relative to the longitudinal axis of the gas turbine, and
the piston seal front end has a tapered portion for contacting the fiat vane.

12. The gas turbine of claim 1, wherein the first one of the two seals is a honeycomb seal, and the first sealing portion of the first vane is a protrusion extending from the first vane, and which extends across the gap to interact with the honeycomb seal.

13. The gas turbine of claim 12 wherein the honeycomb seal is arranged between the picture frame and the bulkhead on one side of the gap.

14. The gas turbine of claim 1, wherein the second sealing portion of the first vane is angled and the other of the two seals is a hula seal extending between the second sealing portion and the bulkhead.

15. The gas turbine of claim 14, wherein a second surface of the bulkhead adjacent to the hula seal and a surface of the second sealing portion adjacent to the hula seal are parallel, and wherein a seal direction of the hula seal being at an angle from a longitudinal axis direction, and wherein the longitudinal axis direction is a direction of the longitudinal axis of the gas turbine, which is parallel to an axis of the first vane and the picture frame.

16. The gas turbine of claim 14, wherein the hula seal is a conical hula seal, an annular hula seal, or a plurality of individual hula seals.

17. The gas turbine of claim 1, wherein the first gap portion includes a volume on one side of the first sealing portion that is adjacent to the hot gas flow, and a volume on an other side of the first sealing portion.

18. A method of cooling a gas turbine which includes a longitudinal axis, a picture frame having a flange extending radially inward, the picture frame being a member of an annular arrangement of a plurality of picture frames arranged around the longitudinal axis of the gas turbine in an annular shape, a first vane, the first vane having a first sealing portion and a second sealing portion, the second sealing portion being configured so that a spot on the second sealing portion surface will move during an operation cycle with a range of movement fitting within an angled rectangular box, angled at a first angle from the longitudinal axis, a bulkhead arranged between the picture frame and the first vane, a gap between the picture frame and the first vane, and the first vane and the bulkhead, the gap including a first gap portion, an intermediate portion and a second gap portion consecutively arranged and delimited by the first vane on one side and by one of the picture frame and the bulkhead on an other side, the first gap portion extending in a direction perpendicular to the longitudinal axis adjacent to a hot gas flow, the second gap portion extending in a direction at a second angle from the longitudinal axis and angled from the direction perpendicular to the longitudinal axis, the second angle being the same as the first angle, the intermediate gap portion including a section parallel to the longitudinal axis, a sealing arrangement to seal the gap, the sealing arrangement having two seals arranged in series, a first one of the two seals being arranged to seal the first gap portion between the picture frame and the first sealing portion of the first vane and between the bulkhead and the first sealing portion of the first vane, the first one of the two seals dividing the first gap portion into a first volume adjacent to a hot gas flow and a second volume on an opposite side of the first one of the two seals to the hot gas flow, a second one of the two seals being arranged to seal the second gap portion between the bulkhead and the second sealing portion of the first vane, and the first one of the two seals configured to seal against a surface of the picture frame, a surface of the bulkhead, and the first sealing portion of the first vane, and wherein the first sealing portion of the first vane is crushed into the first one of the two seals, and the second one of the two seals configured to seal against a surface of the second sealing portion of the first vane and a second surface of the bulkhead, the surface of the second sealing portion of the first vane and the second surface of the bulkhead being parallel and at the second angle the method comprising:
supplying cooling fluid to the gap between the picture frame and/or the bulkhead and the first vane.

19. The method of claim 18, comprising:
maintaining a higher pressure at the end of the gap furthest from a hot gas flow than the pressure at a hot gas flow end of the gap.

20. The method of claim 18, wherein at least one of the seals is a piston seal, the method comprising:
supplying cooling fluid to a volume between the piston seal and the picture frame such that the piston seal remains in contact with the first vane.

* * * * *